June 15, 1965     W. A. BOOTHE     3,189,303
PNEUMATIC SYSTEM FOR MACHINERY SUPPORT
Filed Sept. 6, 1963     2 Sheets-Sheet 1

INVENTOR.
WILLIS A. BOOTHE
BY
ATTORNEY

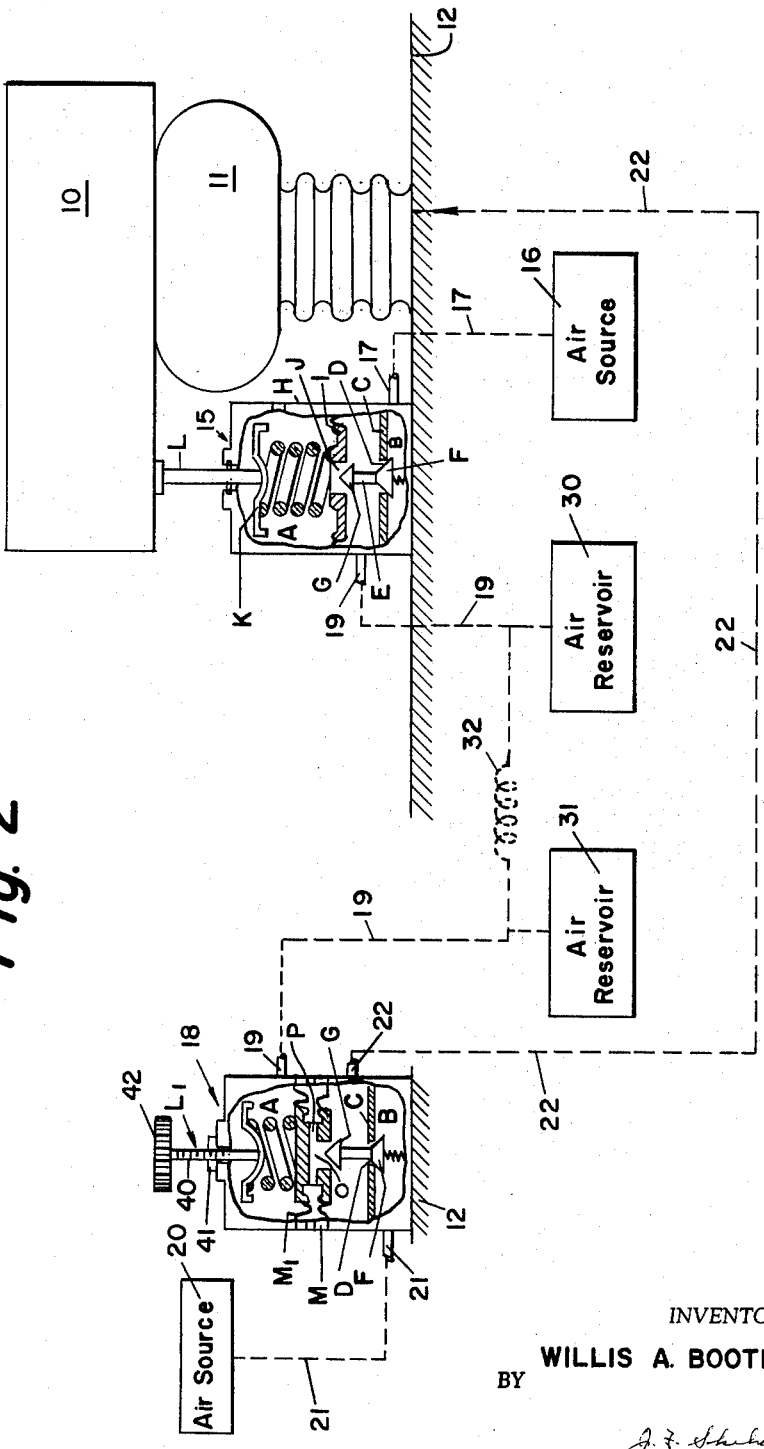

United States Patent Office 3,189,303
Patented June 15, 1965

3,189,303
PNEUMATIC SYSTEM FOR MACHINERY SUPPORT
Willis A. Boothe, Scotia, N.Y., assignor, by mesne assignments, to the United States of America as represented by the Secretary of the Navy
Filed Sept. 6, 1963, Ser. No. 307,272
9 Claims. (Cl. 248—22)

This invention relates to machinery supports for heavy, impact generating machines and in particular is concerned with a system for reducing or isolating machinery vibration.

Resilient mounts presently in use are mostly passive in nature, that is they are formed of blocks of rubber, steel springs or constant volume sealed air supports which become set after periods of use. While these supports operate efficiently for some uses they present a problem, for example, when used with heavy machinery of alignment of the machinery elements due to their large initial set under load, or due to their high sensitivity to any change in load. In the case of rubber mounts, which often acquire a long term drift, shimming of the mounts or replacement of the mounts is usually required after periods of use.

This invention is concerned with a different type of machinery supporting arrangement which may be considered to be an active mount, as distinguished from passive mounts, in that a system of elements is employed which automatically isolates or absorbs vibration and effects a re-levelling of the mount after a change in load. The invention permits mounts of much lower natural frequency than the passive mounts heretofore mentioned to be used with heavy machinery over extended periods without necessitating replacement or repairing of the mounts.

In general, the invention involves the use of a mount which provides an air spring, for example, an expansible bellows type pneumatic container for supporting a load and a system for supplying air to the container in accordance with the force applied thereto by the load. The pneumatic system utilizes an air source for supplying air to a first valve which is positioned to be actuatable by the force of the load and designed to produce a pressure which is proportional to force of the load. Air from the first regulator is directed through a stabilizing zone to a second valve and from the second valve, the air is delivered to the air spring.

The second valve is in the form of a booster type valve and is operative to adjust the pressure of the air admitted thereto before it is delivered to the air spring pneumatic container.

The general object of the invention is to provide a pneumatic system for heavy machinery mounts which provides a smooth cushioning action on vertically directed impacts.

Another object of the invention resides in the provision of a pneumatic system for heavy machinery mounts which provides a substantially constant flow of pneumatic fluid to the mount for cushioning vibration.

Still another object is to support the load on an adjustable volume air container and to provide a system of pneumatic control for the container which automatically absorbs vibration and levels the container after force is applied.

Other objects, advantages and novel features of the invention will become apparent from the following detailed description of the invention when considered in conjunction with the accompanying drawings, wherein:

FIG. 2 is a view similar to FIG. 1 showing another embodiment of the invention.

Figure 1:
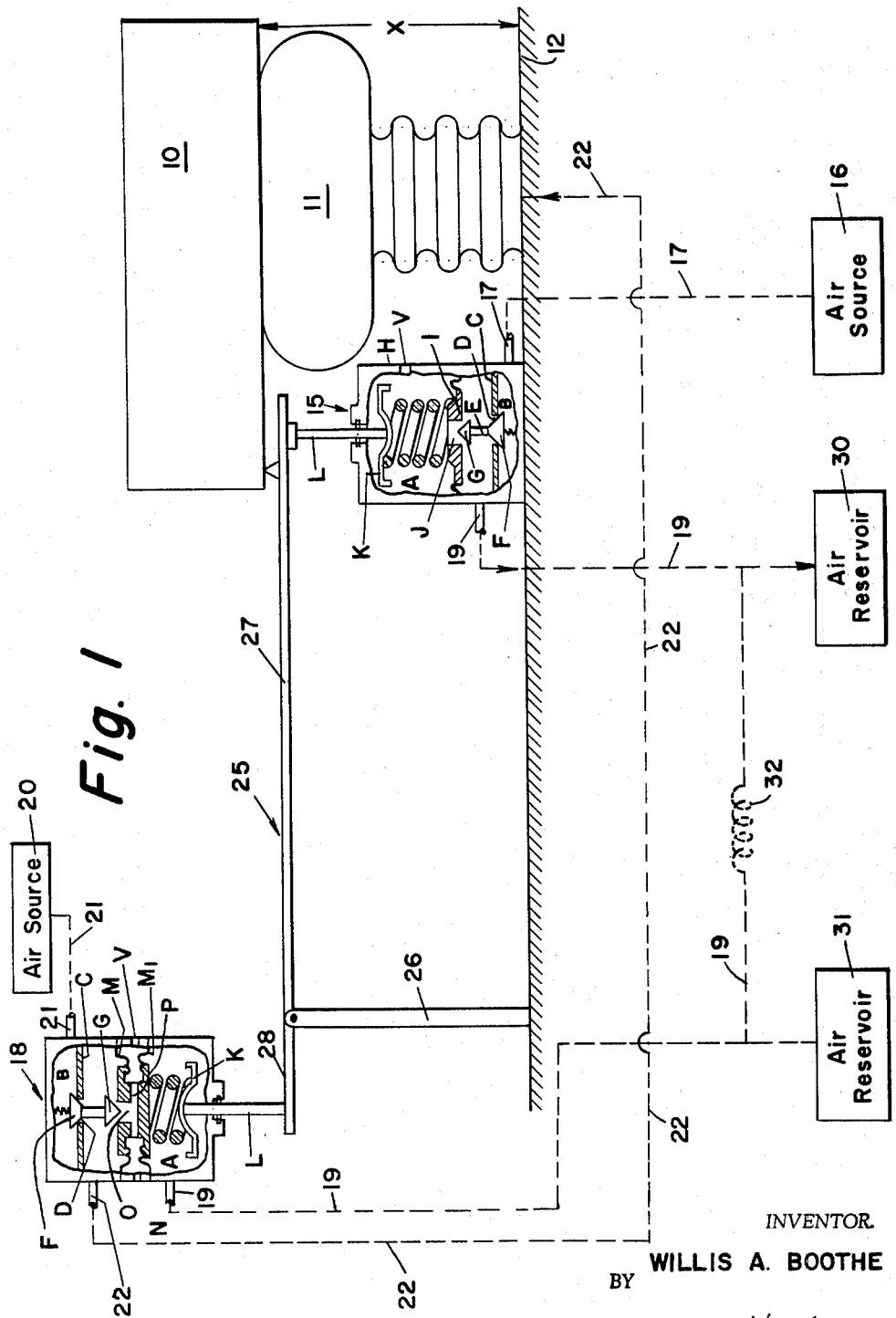
FIG. 1 is a schematic diagram of one embodiment of self-levelling air mount and control system of this invention with elements sectioned to show details.

In the drawings, parts having no recognized symbol are labelled to indicate their function and identical parts in FIGS. 1 and 2 are identified by the same numerals. At 10 is represented a mass load which is mounted on an expansible container 11 which is representative of an air spring and which in turn is supported on a suitable foundation 12. The container or air spring 11 may be any commercial bellows type pneumatic mount suitable for supporting the mass load 10 with which it is used. For example, actual tests were made using a 2000 pound air spring 11 which supported a mass of approximately 2000 pounds to which force was applied cyclically to the top of the mass to determine the dampening or self-levelling effect of the pneumatic control system of the invention. Depending upon the force applied to the mass load 10, the container or air spring 11 will be displaced some value which is represented by the value X shown between the arrowed lines at the right side of the figures.

Minimizing or dampening vibration of container or air spring 11 is made automatic by the use of a lever arrangement as in FIG. 1, while in the modification of FIG. 2, the lever arrangement is omitted and manual control is provided. In both figures, the pneumatic control system is shown by broken lines, while mechanical linkages or connections, valves, etc., used in the system are shown in full lines.

In FIG. 1, a first valve indicated at 15 is supported on foundation 12 and is positioned beneath the mass load 10. Air from an air source 16 is supplied to the valve 15 by line 17 and is directed to a second valve 18 by line 19 and from the second valve, the air is then directed to the air spring or container 11. The air is supplied to air spring or container 11 under controlled flow or stabilized conditions as will be explained in order to minimize vibration of the air spring or container 11 when force is applied thereto by the mass load. The first valve 15 is designed to be operative for producing a pressure which is proportional to the displacement of the air spring 11 and is shown in some detail. As shown, the valve 15 is formed of a housing H which is divided into compartments A and B by a partition C which has a central aperture D therein providing communication between the compartments. A movable valve stem E extends through the aperture D and carries two valve plugs F and G and this assembly is biased by a spring to normally close the aperture D by the plug F. A bellows type diaphragm I is located in compartment A and has a central aperture J therein which coacts with the valve plug G, but is normally open when aperture D is closed and air in chamber A may pass through vent V. A follower and spring assembly K is positioned between the diaphragm I and an actuator shaft L which is operated by movement of the mass load 10 to move diaphragm I to close aperture J and to open the aperture D. In these positions of plugs F and G air which is supplied to compartment B by line 17 passes through the valve 15 and line 19 to the valve 18.

A lever 25 is fulcrumed on an upright 26 which is suitably supported on foundation 12. The lever has the free end of its weight arm 27 disposed between mass load 10 and the actuator L of valve 15 and its power arm 28 positioned to actuate valve 18. Valve 18 is designed to produce a pressure which is proportional to the upward movement of power arm 28.

The valve 18 is shown in detail and its elements which are similar to those of flow control valve 15 are similarly identified and will not be referred to in the description. The flow control valve 18 is shown reversed in position from that of valve 15 and differs therefrom in the details of the diaphragm construction which as shown is formed of a pair of horizontal diaphragm structures M and $M_1$ rather than the single diaphragm of valve 15. Valve structure N is located between the diaphragms M and $M_1$ and forms a vertical passageway O and a communicating horizontal passageway P through which air may pass to vent V when aperture O is open. The valve plug F of valve 18 is normally closed but is opened by actuator L, spring assembly K and diaphragms M and $M_1$ through the upward movement of the lever power arm 28 and in addition by the pressure effect of the air supplied to compartment A by line 19. Movement of the actuator L and the associated elements will also effect a closing of aperture O by plug G and air from a second source 20 is supplied by line 21 to compartment B of the valve and is removed by line 22 for passage to the air spring 11.

Before the air from valve 15 is admitted to valve 18, it is stabilized. This may be accomplished as shown by a first air reservoir 30, a second air reservoir 31 and a capillary or restriction zone 32 located in line 19 between reservoirs 30 and 31. No details of these elements are shown or believed necessary since this assembly functions to smooth the air flow between the valves 15 and 18 and to prevent pressure surges in order that the air directed to valve 18 by line 19 is a relatively smooth flowing stream which provides a dampening effect on the movement of diaphragms M and $M_1$ of valve 18.

The lever 25 may be provided with apertures for varying the length of the weight and power arms 27 and 28 and permit the desired ratio between these arms to be attained for effecting proper or desired operation of the system which will depend on such factors as the weight of load 10 and the construction of air spring 11.

The system of FIG. 2 is generally similar to that of FIG. 1 but differs therefrom in that the valve 18 is not automatically operated by lever or other means to supply air from the second source but is arranged to be manually set for the supply of air from this source. For this purpose, the valve 18 of FIG. 2 differs in a minor respect from the valve 18 of FIG. 1. It will be seen from FIG. 2 that the valve 18 is provided with an actuator $L_1$ which has a screw-threaded area 40, a threaded gland 41 and a knurled cap 42. This arrangement permits the diaphragm assembly M, $M_1$ to be manually adjusted by an operator until the opening O is closed by valve plug G and valve plug F is moved from its closed position relative to opening D in order that a predetermined air flow from the second air source 20 may enter the compartment B through line 21. When the actuator $L_1$ is manually set, the air which is supplied by line 19 from valve 15 is admitted to the compartment A in stabilized condition, as explained in connection with FIG. 1, for the purpose of providing a dampening effect on the diaphragm assembly M, $M_1$.

Since the actuator of valve 18 in FIG. 2 is arranged to be manually set, the valve in this figure is shown reversed in position from that of FIG. 1 since it can be conveniently supported in operating position on the foundation 12 as shown.

Obviously, many modifications and variations of the present invention are possible in the light of the above teachings. It is therefore to be understood that, within the scope of the appended claims, the invention may be practiced otherwise than as specifically described.

I claim:
1. A pneumatic system for machinery which generates vibration comprising
   (a) a pneumatic expansible container supporting the machinery under vibrational movements of the machinery,
   (b) a first normally closed valve which is adjusted to open position in accordance with the vibrational movement of the machinery,
   (c) a first pneumatic source for supplying a first fluid stream to said first valve,
   (d) a second normally closed valve,
   (e) conduit means providing communication between the first and second valves,
   (f) means for adjusting said second valve to open position,
   (g) a second pneumatic source for supplying a second fluid stream to said second valve, and
   (h) said second valve communicating with said expansible container whereby fluid from said first and second streams is effective to minimize the vibrational movement of the container.

2. A pneumatic system for machinery as stated in claim 1, further characterized by the conduit means having means for stabilizing the flow of the first fluid stream.

3. A pneumatic system for machinery as stated in claim 1, further characterized by the conduit means having a pair of fluid reservoirs in communication therewith and a restricted zone therein between the reservoirs for stabilizing the flow of the first fluid stream.

4. A pneumatic system for machinery as stated in claim 1, further characterized by the first valve and the second valve each having an actuator and the means comprising a connector between the actuators which is operable by the downward vibrational movement to adjust both valves to open position.

5. A pneumatic system as stated in claim 1, further characterized by the first valve having an actuator which is operable by the downward vibrational movement to adjust the valve to open position and the means comprises a manually operable actuator for adjusting the second valve to open position.

6. A pneumatic system for machinery as stated in claim 1, further characterized by the first valve and the second valve each comprising a housing having a fixed transverse partition providing an opening, a valve plug normally closing the opening and an actuator for moving the valve plug from the opening under downward vibrational movement.

7. A pneumatic system as in claim 6, further characterized by a pivoted lever between the actuators operable by the downward vibrational movement to simultaneously move the valve plugs from the openings in the partitions.

8. A pneumatic system for machinery as stated in claim 1, further characterized by the first valve and the second valve each comprising a housing having a fixed transverse partition and movable diaphragm means spaced from the partition providing end compartments and a central compartment, a central aperture in the transverse partition and a central aperture in the diaphragm means aligned therewith, a spring biased axial valve shaft having a pair of valve plugs, one of said plugs being normally positioned to close the central aperture in the partition and the other valve plug being normally positioned to open the central aperture in the diaphragm means, an actuator for the diaphragm means having one end extending through one end compartment and operative by its inward movement to reverse the normal position of the valve plugs and permit fluid admitted to the other end compartment to be removed from the central compartment.

9. A pneumatic system for machinery as stated in claim 1, further characterized by the second valve having the conduit means of section (e) in communication with said one end compartment whereby the first fluid exerts additional pressure on the diaphragm means.

References Cited by the Examiner
UNITED STATES PATENTS 2,605,066   7/52   Brown _____ 248—20
2,706,607   4/55   Withers et al. _____ 248—22
2,956,761   10/60  Weber _____ 248—23 XR

FOREIGN PATENTS 1,322,914   2/63   France.
797,530    7/58   Great Britain.

FRANK L. ABBOTT, *Primary Examiner.*